United States Patent
Naito et al.

(10) Patent No.: US 10,570,282 B2
(45) Date of Patent: Feb. 25, 2020

(54) TIRE

(71) Applicant: SUMITOMO RUBBER INDUSTRIES, LTD., Kobe-shi, Hyogo (JP)

(72) Inventors: Yasuo Naito, Kobe (JP); Shintaro Tomita, Kobe (JP); Daisuke Kudo, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 246 days.

(21) Appl. No.: 15/549,914

(22) PCT Filed: Oct. 27, 2015

(86) PCT No.: PCT/JP2015/080213
§ 371 (c)(1),
(2) Date: Aug. 9, 2017

(87) PCT Pub. No.: WO2016/143189
PCT Pub. Date: Sep. 15, 2016

(65) Prior Publication Data
US 2018/0022911 A1    Jan. 25, 2018

(30) Foreign Application Priority Data
Mar. 9, 2015   (JP) ................... 2015-045506

(51) Int. Cl.
| | | |
|---|---|---|
| B60C 1/00 | (2006.01) | |
| C08L 33/20 | (2006.01) | |
| B60C 15/04 | (2006.01) | |
| C08L 63/00 | (2006.01) | |
| B60C 9/00 | (2006.01) | |
| C08G 59/50 | (2006.01) | |
| C08L 9/02 | (2006.01) | |
| C08K 7/06 | (2006.01) | |
| C08J 5/24 | (2006.01) | |

(52) U.S. Cl.
CPC ............... *C08L 33/20* (2013.01); *B60C 1/00* (2013.01); *B60C 9/00* (2013.01); *B60C 15/04* (2013.01); *C08G 59/50* (2013.01); *C08J 5/24* (2013.01); *C08K 7/06* (2013.01); *C08L 9/02* (2013.01); *C08L 63/00* (2013.01); *B60C 2001/005* (2013.01)

(58) Field of Classification Search
CPC .... C08L 33/20; C08L 63/00; B60C 2001/005; B60C 1/00; B60C 9/00; B60C 15/04
See application file for complete search history.

(56) References Cited

U.S. PATENT DOCUMENTS

| | | | | |
|---|---|---|---|---|
| 3,237,674 A | * | 3/1966 | Budd | B60C 15/04 152/540 |
| 4,075,048 A | * | 2/1978 | Lupton | B29D 30/48 152/539 |
| 4,098,316 A | * | 7/1978 | Carvalho | B29D 30/48 152/540 |
| 4,320,791 A | * | 3/1982 | Fujii | B60C 15/04 152/540 |
| 4,883,712 A | | 11/1989 | Ogawa et al. | |
| 5,885,388 A | * | 3/1999 | Ueyoko | B60C 15/04 152/525 |
| 6,070,632 A | * | 6/2000 | Huinink | B60B 21/021 152/379.5 |
| 6,453,960 B1 | | 9/2002 | Kondo et al. | |
| 2004/0039120 A1 | | 2/2004 | Takeyama et al. | |
| 2005/0004271 A1 | | 1/2005 | Hong | |
| 2006/0147711 A1 | | 7/2006 | DiMascio, II et al. | |
| 2010/0222480 A1 | | 9/2010 | Christiansen, III et al. | |
| 2012/0231193 A1 | | 9/2012 | DiMascio, II et al. | |
| 2015/0059955 A1 | * | 3/2015 | Kouno | B60C 15/04 152/541 |

FOREIGN PATENT DOCUMENTS

| | | |
|---|---|---|
| CN | 1796076 A | 7/2006 |
| CN | 101541564 A | 9/2009 |
| CN | 102555692 A | 7/2012 |
| CN | 103753901 A | 4/2014 |
| JP | 62-149978 A | 7/1987 |
| JP | 64-16404 A | 1/1989 |
| JP | 1-24642 B2 | 5/1989 |
| JP | 2004-346092 A | 12/2004 |
| JP | 2008-95222 A | 4/2008 |
| JP | 2010-510124 A | 4/2010 |
| TW | 557309 B | 10/2003 |
| WO | WO 00/50495 A1 | 8/2000 |

(Continued)

OTHER PUBLICATIONS

English-language machine translation of JPS62149978, conducted in Espacenet website on Jun. 7, 2019.*
Raju Thomas, et al., "Influence of Carboxyl-Terminated (Butadiene-co-acrylonitrile) Loading on the Mechanical and Thermal Properties of Cured Epoxy Blends," 42 J. Polymer Science: Part B: Polymer Physics 2531 (2004).*
Extended European Search Report, dated Jun. 29, 2018, for European Application No. 15884673.3.
International Preliminary Report on Patentability and the English translation of the Written Opinion of the International Searching Authority (Forms PCT/IB/338, PCT/IB/373 and PCT/ISA/237), dated Sep. 21, 2017, for International Application No. PCT/JP2015/080213.

(Continued)

*Primary Examiner* — Nicholas E Hill
(74) *Attorney, Agent, or Firm* — Birch, Stewart, Kolasch & Birch LLP

(57) ABSTRACT

According to a tire comprising a CFRP comprising a matrix resin and a carbon fiber, in which the matrix resin comprises a resin component comprising 20 to 80% by mass of an epoxy resin and 20 to 80% by mass of a functional group-modified acrylonitrile butadiene copolymer, it is possible to provide a tire which is lightened while maintaining the strength of a tire with a steel cord and/or a bead wire.

4 Claims, No Drawings

(56) References Cited

FOREIGN PATENT DOCUMENTS

| WO | WO 2005/047028 A1 | 5/2005 |
| WO | WO 2008/061544 A1 | 5/2008 |
| WO | WO 2008/104822 A1 | 9/2008 |

OTHER PUBLICATIONS

International Search Report, issued in PCT/JP2015/080213 (PCT/ISA/210), dated Dec. 22, 2015.
Written Opinion of the International Searching Authority, issued in PCT/JP2015/080213 (PCT/ISA/237), dated Dec. 22, 2015.
Chinese Office Action and Search Report dated May 13, 2019, for corresponding Chinese Patent Application No. 201580076879.0, with English translation.

* cited by examiner

TIRE

TECHNICAL FIELD

The present invention relates to a tire comprising a CFRP that comprises a specified matrix resin and a carbon fiber.

BACKGROUND ART

Improvement of fuel efficiency of tires has been strongly demanded and the improvement of fuel efficiency by improving a rubber composition which composes a tire or by using a lighter tire has been proposed. With respect to a component ratio of raw materials of a pneumatic tire, cords including a steel cord, a bead wire, a resin cord and the like account for the second largest ratio next to a rubber composition rubber component and compounding agents) and therefore, an attempt of improving fuel efficiency of tires by improving these cords, which results in lightening of a tire, has been made.

Since a steel cord and a bead wire are excellent in elastic modulus, strength, initial modulus, heat resistance, dimension stability and the like, these are used as a reinforcing material of a tire. For example, a steel cord is embedded in a belt and the like of a pneumatic tire as a reinforcing material and greatly contributes to secure the strength and shape stability of a tire. Further, by using a bead wire as a bead core of a pneumatic tire, a bead with enough strength necessary for a bead portion and with enough elasticity that can cope with deformation at rim assembling can be obtained.

Methods of lightening cord such as replacing a steel cord or a bead wire with a CFRP (carbon fiber reinforced resin) have been proposed as a method of lightening a tire while maintaining properties such as strength. However, traditionally used CFRPs, which are produced by impregnating a carbon fiber with a matrix resin consisting of an epoxy resin and then curing an impregnated carbon fiber, have a very high elastic modulus. Therefore, there is a problem that a break due to bending easily arises. Particularly, if a bead wire is replaced by a CFRP which is easily subject to a break due to bending, there is a problem that it cannot cope with deformation at rim assembling and a break arises.

As a method of solving the above problems, Patent Document 1 describes that durability and steering stability are improved by using a belt component containing a carbon fiber and a matrix phase consisting of a cured liquid thermosetting resin or a cured liquid rubber in a specified volume ratio. However, neither a combined use of an epoxy resin and a functional group-modified acrylonitrile butadiene copolymer nor fuel efficiency has been considered.

Patent Document 2 disclose a tire having a first ply in which a carbon fiber cord is coated with a coating rubber but not an epoxy resin. However, there is a problem in durability since an adhesion between the carbon fiber cord and the coating rubber is insufficient and there is also a problem that the effect of improving fuel efficiency by lightening is insufficient.

PRIOR ART DOCUMENTS

Patent Documents

Patent Document 1: JP H01-024642 B2
Patent Document 2: JP S64-016404 A

SUMMARY OF THE INVENTION

Problem to be Solved by the Invention

An object of the present invention is to provide a tire which is lightened while maintaining the strength of a tire using a steel cord and/or a bead wire.

Means to Solve the Problem

The inventors of the present invention have found that by using a CFRP comprising a matrix resin and a carbon fiber for a tire, wherein the matrix resin comprises specified amounts of an epoxy resin and a functional group-modified acrylonitrile butadiene copolymer, a tire which is lightened while maintaining the strength is obtained, and they have completed the present invention.

Namely, the present invention relates to a tire comprising a CFRP comprising a matrix resin and a carbon fiber, in which the matrix resin comprises a resin component containing 20 to 80% by mass of an epoxy resin and 20 to 80% by mass of a functional group-modified acrylonitrile butadiene copolymer.

It is preferable that the matrix resin is a matrix resin having an initial elastic modulus of 0.1 to 1,000 MPa and an elongation at break of not less than 50% and being free from yield at an elongation of 50%.

It is preferable that the CFRP is used for a bead core.

It is preferable that the CFRP is used for a part of a bead core.

Effects of the Invention

According to the tire comprising a CFRP comprising a matrix resin and a carbon fiber, in which the matrix resin comprises specified amounts of an epoxy resin and a functional group-modified acrylonitrile butadiene copolymer, it is possible to provide a tire which is lightened while maintaining the strength in the case where a steel cord and a bead wire are used.

EMBODIMENT FOR CARRYING OUT THE INVENTION

The tire of the present invention is characterized in that a CFRP comprising a matrix resin and a carbon fiber is used, in which the matrix resin comprises a resin component comprising specified amounts of an epoxy resin and a functional group-modified acrylonitrile butadiene copolymer.

The matrix resin is a resin to be a base material of a CFRP and in the present invention, is characterized by comprising a resin component comprising specified an of an epoxy resin and a functional group-modified acrylonitrile butadiene copolymer.

The epoxy resin is not limited particularly as long, as it is a compound containing two or more epoxy groups consisting of two carbon atoms and one oxygen atom in a molecule, and is a compound in which a ring of the epoxy groups is opened at a cure reaction to cause a crosslinking reaction with another epoxy resin or a functional group-modified acrylonitrile butadiene copolymer (in some cases, a crosslinking reaction with a curing agent) and a cured matrix resin can be formed. Examples of such epoxy resin include glycidylether-type epoxy resins such as a bisphenol A-type epoxy resin, a brominated bisphenol A-type epoxy resin, a hydrogenated bisphenol A-type epoxy resin, a bisphenol F-type epoxy resin, a bisphenol S-type epoxy resin, a bisphenol AF-type epoxy resin, a biphenyl-type epoxy resin, a naphthalene-type epoxy resin, a fluorene-type epoxy resin, a novolac-type epoxy resin, a phenol-novolac-type epoxy resin, an o-cresol-novolac-type epoxy resin, a tris(hydroxyphenyl)methane-type epoxy resin, a tetraphenylolethane-type epoxy resin, a glycidylester-type epoxy resin obtained by a condensation between epichlorohydrin and a carboxylic acid, a heterocyclic epoxy resin such as a hydantoin-type epoxy resin obtained by a reaction between triglycidyl isocyanate or epichlorohydrin and hydantoins, and the like. Among these, a bisphenol A-type epoxy resin is preferable since a matrix resin having a high strength and a low viscosity can be obtained.

The content of the epoxy resin in the resin component is not less than 20% by mass, preferably not less than 25% by mass, more preferably not less than 30% by mass. if the content of the epoxy resin is less than 20% by mass, there is a tendency that a crosslinking after curing becomes insufficient and a desired elastic modulus or degree of elongation is difficult to obtain. On the other hand, the content of the epoxy resin in the resin component is not more than 80% by mass, preferably not more than 75% by mass, more preferably not more than 70% by mass. If the content of the epoxy resin exceeds 80% by mass, there is a tendency that an elastic modulus of the resin after curing becomes high, a sufficient degree of elongation is not obtained and the resin becomes brittle.

The weight-average molecular weight (Mw) of the epoxy resin is preferably not less than 200, more preferably not less than 300 since handling at room temperature of a carbon fiber impregnated with the matrix resin is easy. If the Mw is less than 200, there is a tendency that the viscosity at room temperature becomes low and handling becomes difficult. On the other hand, the Mw is preferably not more than 10,000, more preferably not more than 9,000. If the Mw exceeds 10,000, there is a tendency that an uncured resin becomes hard and a formation or lamination of a pre-preg at morn temperature becomes difficult.

The functional group-modified acrylonitrile butadiene copolymer is not limited particularly as long as it is an acrylonitrile butadiene copolymer having a functional group which causes a crosslinking reaction with the epoxy resin in which a ring of the epoxy groups is opened (in some cases, a crosslinking reaction with a curing agent) and can form a cured matrix resin. Preferable examples of the function group include a carboxyl group, an amino group, an epoxy group, a vinyl group and the like and an amino group is more preferable.

The content of the functional group-modified acrylonitrile butadiene copolymer in the resin component is not less than 20% by mass, preferably not less than 25% by mass, more preferably not less than 30% by mass. If the content of the functional group-modified acrylonitrile butadiene copolymer is less than 20% by mass, there is a tendency that a degree of elongation of the resin after curing becomes insufficient and the resin becomes brittle. On the other hand, the content of the functional group-modified acrylonitrile butadiene copolymer in the resin component is not more than 80% by mass, preferably not more than 75% by mass, more preferably not more than 70% by mass. If the content of the functional group-modified acrylonitrile butadiene copolymer exceeds 80% by mass, there is a tendency that the crosslinking of the resin after curing becomes insufficient and desired physical properties are not obtained.

The resin component may include resin components other than the epoxy resin and the functional group-modified acrylonitrile butadiene copolymer. As other resin components, thermoplastic resins such as a polyvinyl acetal resin, a phenoxy resin, polyester, polycarbonate, polyarylene oxide, polysulfone, polyamide, and polyimide, thermosetting reins other than an epoxy resin and the like can be suitably blended within a range that does not impair the effect of the present invention. If the resin component includes other resin components, the content thereof in the resin component is preferably not more than 10% by mass, more preferably not more than 8% by mass, further preferably not more than 6% by mass since the handling of the uncured resin at room temperature is easy.

It is preferable that the matrix resin includes additives such as a curing agent or a curing accelerator other than the above resin components since the strength can be improved by sufficiently prorating a crosslinking reaction. It should be noted that curing of an epoxy resin only needs a curing agent, but the matrix resin according to present invention can be cured by a reaction between a ring-opened epoxy group of the epoxy resin and a functional group of the functional group-modified acrylonitrile butadiene copolymer.

Ones used as a curing agent of epoxy resins can be used as the curing agent. Examples thereof include dicyandiamide (DICY), 4,4'-diaminodiphenylmethane, 4,4'-diaminodiphenylsulfone, 3,3'-diaminodiphenylmethane, 3,3'-diaminodiphenylsulfone and the like. Among these, DICY is preferable since it is excellent in stability at normal temperature. If the matrix resin includes a curing agent, the content thereof is preferably not less than 2 g, more preferably not less than 3 g, further preferably not less than 4 g based on 1 mol of the epoxy group for the reason that a reaction is sufficiently promoted and the strength is improved. On the other hand, the content is preferably not more than 20 g, more preferably not more than 19 g, further preferably not more than 18 g based on 1 mol of the epoxy group for the reason that deterioration of the strength due to remaining unreacted substances is prevented.

Ones used as a curing accelerator of epoxy resins can be used as the curing accelerator. Examples thereof include 3-phenyl-1,1-dimethylurea, 3-(4-chlorophenyl)-1,1-dimethylurea, 3-(3,4-dichlorophenyl)-1,1-dimethylurea (DCMU) and the like, and among these, DCMU is preferable. If the matrix resin includes a curing accelerator, a content ratio to the curing agent (curing agent/curing accelerator) is preferably not less than 1.0, more preferably not less than 1.2, further preferably not less than 1.4. On the other hand, the content ratio is preferably not more than 10, more preferably not more than 9, further preferably not more than 8. The content ratio of the curing agent to the curing accelerator within this range tends to make physical properties of the resin after curing satisfactory.

The matrix resin can be cured by compounding additives to the resin component comprising the epoxy resin and the functional group-modified acrylonitrile butadiene copolymer as necessary, and then by e.g. heating to open an epoxy group of the epoxy resin and to cause a crosslinking reaction with another epoxy resin or the functional group-modified acrylonitrile butadiene copolymer in some cases, a crosslinking reaction with a curing agent). The curing conditions can be suitably adjusted depending on the compounded resin component or curing agent, and curing can be completed by a treatment at 100 to 200° C. for 5 to 150 minutes.

The initial elastic modulus of the matrix resin after curing is preferably not less than 0.1 MPa, more preferably not less than 0.3 MPa, further preferably not less than 0.5 MPa. If the initial elastic modulus is less than 0.1 MPa, a plastic deformation easily arises and durability of a tire may be deteriorated. On the other hand, the initial elastic modulus is preferably not more than 1,000 MPa, more preferably not more than 700 MPa, further preferably not more than 400 MPa. If the initial elastic modulus exceeds 1,000 MPa, is decreased, a break easily arises due to deformation such as bending and durability of a tire may be deteriorated. It is noted that the initial elastic modulus of the matrix resin as used herein is an elastic modulus at a load of 20 to 40 N in a tensile test, The strength at break of the matrix resin after curing is preferably not less than 1.0 MPa, more preferably not less than 1.5 MPa, further preferably not less than 2.0 MPa. If the strength at break is less than 1.0 MPa, durability tends to deteriorate. On the other hand, the strength at break is preferably not more than 100 MPa, more preferably not more than 90 MPa, further preferably not more than 80 MPa. If the strength at break exceeds 100 MPa, the elastic modulus tends to become too high and durability of a tire may deteriorate.

The elongation at break of the matrix resin after curing is preferably not less than 50%, more preferably not less than 55%, further preferably not less than 60%. If the elongation at break is less than 50%, the matrix resin cannot follow the deformation of a tire and durability of a tire may deteriorate due to generation of a crack. The upper limit of the elongation at break is not limited particularly and is normally 300%.

It is further preferable that there is no yield in the matrix resin after curing at a degree of elongation of 50%. If an yield is generated in a degree of elongation of less than 50%, the quality or shape of a tire may not be maintained because a plastic deformation is easily generated. It is noted that the yield of the matrix resin as used herein means that a drop of stress is observed in a tensile test and a deformation still remains even after the stress being removed.

It is noted that the initial elastic modulus, the strength at break, the elongation at break and the presence of yield at a degree of elongation of 50% as used herein are values measured under conditions of a tensile speed of 5 mm/min and a distance between chucks of 58 mm using a matrix resin shaped into a No. 4 dumbbell o JIS K 6251 after curing. It is also noted that the initial elastic modulus is calculated within a range of a load of 20 to 40 N. The Autograph manufactured by SHIMADZU CORPORATION and the like may be used as a measuring apparatus.

Examples of the carbon fiber include a PAN-based carbon fiber using an acryl fiber as raw material and a pitch-based carbon fiber using a pitch (a by-product of petroleum, coal, coal tar and the like) as raw material. While the both carbon fibers can be used in the present intention, it is preferable that the PAN-based carbon fiber is used since it has a strong tensile strength.

The CFRP (carbon fiber reinforced resin) according to the present invention can be produced by preparing a pre-preg in which the carbon fiber is impregnated with the matrix resin, shaping the pre-preg into a desired shape and then conducting curing. An example of a method of impregnating a carbon fiber bundle with a matrix resin includes a method of impregnating a carbon fiber bundle with a liquid matrix resin by use of a roller, or a method of sandwiching a carbon fiber cloth with a sheet-like matrix resin and then impregnating the carbon fiber cloth by pressurization or the like. The content of the matrix resin in the pre-preg is preferably 15 to 50% by mass, more preferably 20 to 40% by mass from the viewpoint of adhesion with the carbon fiber and lightening of a tire.

The tire of the present invention is characterized in that a CFRP is used as a part of cords. Examples of the cord to be replaced by a CFRP include a steel cord or bead wire for the reason that its component ratio in the raw material of a tire is high, the effect of lightening the tire by replacement is high and the strength is also maintained, and preferably all or a part of a steel cord or bead wire is replaced by a CFRP. Since the CFRP of the present invention can stand a large deformation at rim assembling, it is preferable that all or a part of a bead wire is replaced by the CFRP. Moreover, a tire in which a part of a bead wire is replaced by a CFRP, namely, a tire using a bead core composed of a CFRP and a bead wire is preferable since a property of the CFRP characterized in that a flexural modulus is small can be compensated and even if a large force is applied during the formation of a tire, the tire can be returned to the original shape. In the bead wire used in combination with the CFRP, a conventional bead wire coated with a rubber composition for coating a bead wire can be used.

If the CFRP is used as a bead wire of a tire, a tire of the present invention can be produced by preparing a pre-preg in which a carbon fiber bundle is impregnated with a matrix resin, laminating the pre-preg into the shape of a bead wire to obtain a desired stiffness, curing the laminated pre-preg and using the obtained CFRP bead wire in place of all or a part of a conventional bead wire.

If the CFRP is used in place of a steel cord embedded in a belt portion of a tire, a pre-preg in which a carbon fiber bundle is impregnated with a matrix resin is prepared, the pre-preg is laminated such that a desired stiffness is obtained and this CFRP cord (pre-prey) can he used in place of all or a part of a conventional steel cord. In this case, the tire of the present invention can be obtained by producing an unvulcanized tire in which the CFRP cord (pre-preg) is embedded in a belt layer and vulcanizing it whereby the CFRP cord being cured by the heat in a vulcanization process.

The tire of the present invention can be produced by a normal method except that a CFRP is used as a part of cords. The tire of the present invention can be suitably used as tires for passenger vehicle, tires for bus, tires for truck and the like.

EXAMPLE

The present invention will be described based on Examples, but the present invention is not limited thereto only.

A variety of chemicals used in Examples and Comparative examples will be collectively explained below.

Epoxy resin 1: jER828 (bisphenol A-type epoxy resin, epoxy equivalent: 184 to 194) manufactured by Mitsubishi Chemical Corporation Epoxy resin 2: jER4005P (bisphenol F-type epoxy resin, Mw: 8,500, epoxy equivalent: 950 to 1,200)

Amino group-modified acrylonitrile butadiene copolymer (ATBN): ATBN1300X16 manufactured by CVC Thermoset Specialties Curing agent: DICY7 (fine powder product of dicyandiamide) manufactured by Mitsubishi Chemical Corporation Curing accelerator: DCMU-99 manufactured by Hodogaya Chemical Co., Ltd.

Carbon fiber: MR 60H 24P (filament diameter: 5 μm, number of filaments: 24,000) manufactured by Mitsubishi Rayon. Co., Ltd.

Bead wire 1: made of steel, diameter: 1.2 mm, structure: 4+4+4, coated with a rubber composition Bead wire 2: made of steel, diameter: 1.2 mm, structure: four lines and one step, coated with a rubber composition.

Preparation of Matrix for Test

According to a formulation content shown in Table 1, the resin component, the curing agent and the curing accelerator were mixed and the temperature of the mixture was elevated from room temperature to 170° C. in 30 minutes using a casting mold (plate of 2 mm) and then the mixture was held at 170° C. for 10 minutes to be cured. After that, the state was adjusted under conditions of 25° C. a humidity of 50% and a time of 48 hours and then the mixture was stamped out to the shape of a No. 4 dumbbell to prepare a matrix resin for test.

<Tensile Test>

By use of the Autograph manufactured by SHIMADZU CORPORATION, "initial elastic modulus", "strength at break", "elongation at break" and "presence of yield at a degree of elongation of 50%" of each matrix resin for test were measured under conditions of a tensile speed of 5 mm/min and a distance between chucks of 58 mm. The results are shown in Table 1

Resin contents of pre-pregs, the number of laminates at formation of bead cores and evaluation results are shown in Table 2.

<Measurement of Mass of Bead Core>

The mass of each bead core for test was measured and shown by index, assuming that the result of Comparative example 1 is 100. The lower the index of mass is, the lower the mass of the bead core and the lighter the bead core is.

<Test of Hofmann Fastening Force>

In a bead portion of a tire before rim assembling, a radially uniform force is applied from the center to the outer side of the tire and a force at which the inner diameter of the bead portion becomes the outer diameter of the rim was measured and the results are shown by index, assuming that the result of Comparative example 1 is 100. The higher the index of fastening force is, the more excellent the fastening force at rim assembling is. It is noted that a target value for performance is 55 to 120.

TABLE 1

| | Matrix resin | | | | | | |
|---|---|---|---|---|---|---|---|
| | 1 | 2 | 3 | 4 | 5 | 6 | 7 |
| Compounded amount (part by mass) | | | | | | | |
| Epoxy resin 1 | 50 | 90 | 80 | 70 | 34 | 20 | 10 |
| Epoxy resin 2 | 50 | — | — | — | — | — | — |
| ATBN | — | 10 | 20 | 30 | 66 | 80 | 90 |
| Curing agent | 8.0 | 4.0 | 3.7 | 3.0 | 1.5 | 0.9 | 0.5 |
| (content based on 1 mol of epoxy group (g)) | (25.8) | (8.4) | (8.8) | (8.1) | (8.9) | (8.6) | (9.5) |
| Curing accelerator | 2.0 | 1.0 | 0.9 | 0.8 | 0.4 | 0.2 | 0.1 |
| Evaluation results | | | | | | | |
| Initial elastic modulus (MPa) | 2,500 | 1,300 | 950 | 150 | 7 | 0.8 | 0 |
| Strength at break (MPa) | 89 | 70 | 62 | 58 | 13 | 4 | 1 |
| Elongation at break (%) | 4.5 | 23 | 52 | 67 | 148 | 200 | 250 |
| Yield at a degree of elongation of 50% | Present | Present | Absent | Absent | Absent | Absent | Absent |

Examples and Comparative Examples

Each of carbon fibers was impregnated with each of uncured matrix resins 1 to 7 with a roller to prepare pre-pregs. Each of these pre-pregs was wound around on a metallic jig and formed into a shape of bead core and curing was conducted under the condition of holding at 170° C. for 10 minutes to prepare bead cores for test. As to Examples 5 and 6, each of pre-pregs was wound around on a steel wire 2 and formed into a shape of bead core wherein the steel wire 2 had been set on a metallic jig and formed into a shape of bead core, and curing was conducted under the condition of holding at 170° C. for 10 minutes to prepare bead cores for test. Each tire for test (size: 195/65R15 91H) was formed using the obtained bead cores for test and the following evaluation tests were conducted. It is noted that a tire for test was prepared for Comparative example 1. using a bead core for test consisting of a steel wire, and the tire was evaluated.

<Test of Fitting Force>

Air pressure when each tire had been mounted to a rim (size: 15×6J) was measured and the results are shown by index, assuming that the result of Comparative example 1 is 100. The less the index of fitting force is, the easier the fitting is.

<Test of Breaking Resistance Against Water Pressure>

Each tire was mounted to a rim (size: 15×6J) and water was poured into each tire till an inner pressure of the tire became 200 kPa and the inner pressure at which the tire was broken was measured. The results are shown by index, assuming that the result of Comparative example 1 is 100. The higher the index of breaking resistance against water pressure is, the more excellent the breaking resistance against water pressure is. It is noted that a target value for performance is not less than 85.

TABLE 2

|  | Comparative Examples | | | Examples | | | | Com. Ex. | Examples | |
| --- | --- | --- | --- | --- | --- | --- | --- | --- | --- | --- |
|  | 1 | 2 | 3 | 1 | 2 | 3 | 4 | 4 | 5 | 6 |
| Configuration of bead core | Steel wire 1 | CFRP | CFRP | CFRP | CFRP | CFRP | CFRP | CFRP | Steel wire 2 + CFRP | Steel wire 2 + CFRP |
| Matrix resin (See Table 1) | — | 1 | 2 | 3 | 4 | 5 | 6 | 7 | 4 | 5 |
| Content of matrix resin (% by mass) | — | 30 | 30 | 30 | 30 | 30 | 30 | 30 | 30 | 30 |
| Number of laminates (layers) | — | 15 | 15 | 15 | 15 | 15 | 15 | 15 | 11 | 11 |
| Evaluation result | | | | | | | | | | |
| Index of mass | 100 | 30 | 30 | 30 | 30 | 30 | 30 | 30 | 48 | 48 |
| Index of fastening force | 100 | 105 | 101 | 98 | 98 | 94 | 89 | 83 | 101 | 98 |
| Index of fitting force | 100 | 98 | 95 | 96 | 99 | 90 | 89 | 85 | 97 | 96 |
| Index of breaking resistance against water pressure | 100 | 52 | 53 | 110 | 110 | 110 | 108 | 81 | 105 | 99 |

In the test of breaking resistance against water pressure of Comparative example 2 as shown in Table 2, the bead was bent and the tire was broken in an earlier stage.

From the results shown in Table 2, it is found that by using a CFRP comprising a matrix resin and a carbon fiber for a tire, wherein the matrix resin comprises specified amounts of an epoxy resin and a functional group-modified acrylonitrile butadiene copolymer, a tire which is lightened while maintaining the strength can be obtained.

The invention claimed is:

1. A tire comprising:
a carbon fiber reinforced resin comprising a matrix resin and a carbon fiber, wherein the matrix resin comprises a resin component comprising 30 to 80% by mass of an epoxy resin, 20 to 70% by mass of an amino group-modified acrylonitrile butadiene copolymer and a curing agent.

2. The tire of claim 1, wherein the matrix resin is a matrix resin having an initial elastic modulus of 0.1 to 1,000 MPa and an elongation at break of not less than 50% and being free from yield at a degree of elongation of 50%.

3. The tire of claim 1, wherein the tire comprises a bead core formed from the carbon fiber reinforced resin.

4. The tire of claim 1, wherein the tire comprises a bead core formed in part from the carbon fiber reinforced resin.

* * * * *